(No Model.)

E. COOMAN & P. DALLARD.
PIPE JOINT.

No. 246,293. Patented Aug. 30, 1881.

Witnesses.

Inventors.

UNITED STATES PATENT OFFICE.

EDOUARD COOMAN AND PIERRE DALLARD, OF PARIS, FRANCE.

PIPE-JOINT.

SPECIFICATION forming part of Letters Patent No. 246,293, dated August 30, 1881.

Application filed June 13, 1881. (No model.) Patented in France February 26, 1881.

*To all whom it may concern:*

Be it known that we, EDOUARD COOMAN and PIERRE DALLARD, both of Paris, in the Republic of France, have invented a new and useful Improved Pipe-Joint, (for which we have obtained a patent in France, bearing date the 26th of February, A. D. 1881, No. 141,374,) of which the following is a specification.

The invention refers to pipe couplings or joints; and it consists in the mode of forming the pipe ends, in combination with two hinged claws or fasteners and rubber seatings, so that the pipes may be readily connected and disconnected.

The invention is performed by making the ends of the pipes to project, so far as a half-section of their length is concerned, in such fashion that the projecting half of one pipe will lie on or over, fit, and abut against the similar projecting half-section of the other pipe. A claw attachment is hinged to each pipe, which is furnished with a projecting piece or rim, on which the claws catch or lock. The inner periphery of each pipe has a recessed channel, and holds a rubber or leather washer, and the outside of pipe is recessed to fix readily to rubber or other hose.

Figure 3:
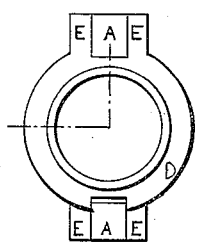
Figure 1:
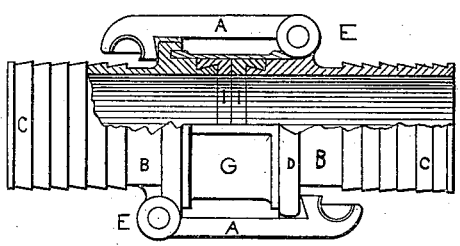
Figure 4:
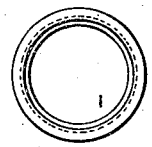
Figure 5:
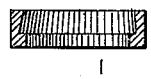
Figure 2:
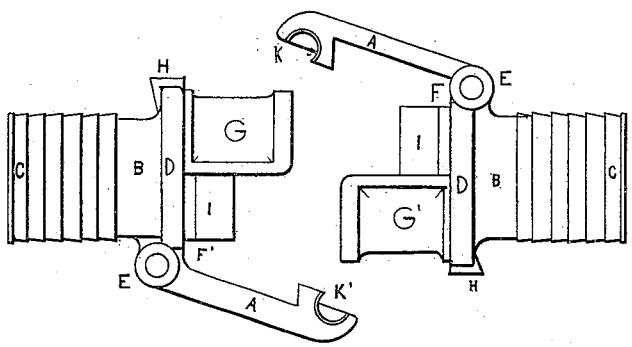

In the drawings annexed, Figure 1 is a sectional side view; Fig. 2, an elevation; Fig. 3, front or end view; Figs. 4 and 5, plan and section of rubber washer I.

A are the claws, pivoted or hinged at E and supplied with finger-recesses K K'. B is the pipe; C, recesses to hold leather or other hose; I I', rubber washers; G G', upper and under projecting junction-section of pipe; D, shoulder-piece carrying the locking-piece H; F, butting-pieces.

We claim—

The pipe-joint combination consisting of the claws A, rubber seatings I, and projections G G', together with the locking-pieces H, all substantially as described and illustrated, and for the purpose set forth.

In testimony whereof we have signed this specification in the presence of two subscribing witnesses.

EDOUARD COOMAN.
PIERRE DALLARD.

Witnesses:
ROBT. M. HOOPER,
LERDISCH.